Patented Nov. 24, 1931

1,833,320

UNITED STATES PATENT OFFICE

EDWARD W. DAVIS, OF MINNEAPOLIS, MINNESOTA, ASSIGNOR TO DAVIS STEEL PROCESS CORPORATION, A CORPORATION OF DELAWARE

PROCESS OF REDUCING IRON ORES

No Drawing.   Application filed July 17, 1928.   Serial No. 293,491.

This invention relates to a process of reducing iron from its ores, and in particular to a process in which the reduction of the ore and the production therefrom of pig iron or steel take place in a furnace of the reverberatory type.

There are many iron ores and iron-containing materials which because of their structure or relatively low iron content cannot be treated economically in the ordinary blast furnace without resort to beneficiating operations. Theoretically the reverberatory furnace should be ideally suited for use in treating such ores and iron-containing materials but so far as I am aware no one has previously developed a satisfactory commercial process of producing metal in a fluid state by the reduction of iron ores in such a furnace.

In the operation of a furnace of the reverberatory type in smelting iron ores, I have discovered that it is necessary to observe certain rules. For the successful operation of this type of furnace, it is necessary to recover in usable form a large proportion of the metal contained in the ore. This can only be accomplished if the slag that is formed is low in iron content. The high recovery of the iron is necessary for economical reasons and for the conservation of materials. It has been found that in the economic operation of this type of furnace on the class of materials hereinbefore described the atmosphere in the furnace is oxidizing, at the temperatures of operation, toward the metal produced. As a result whenever in the course of the operation any reduced metal becomes exposed to the furnace gases, there is a tendency toward reoxidation of such metal. This reoxidation causes a high loss of iron in the slag. Attempts have been made in the past to overcome this reoxidation by operating the furnace with a reducing gas, or by using additional fuel with the ore or by protecting the surface of the ore from the gases of the furnace by addition of materials such as carbon, lime, silica, etc., designed to form a protective covering. These methods are all uneconomical and difficult; and this probably accounts for the fact that none of these methods have come into practical operation. It is one of the objects of this patent to overcome economically this reoxidation.

It has been known for a long time that iron ore can be reduced to metallic iron at low temperatures and also that slag formed from the gangue or added slag-forming materials can be made fluid at relatively low temperatures. It is, therefore, evident that a low temperature, say a furnace operating temperature of 1300° C., is sufficient to reduce the iron-bearing materials to metallic iron and melt the slag-forming constituents in the charge. However, for satisfactory operation in the production of fluid metal it is also necessary to carburize the metal that has been reduced. This is accomplished only after the reduction has taken place, and is necessary in order to cause the metal to melt quickly at a reasonable temperature in the furnace. It has previously been ascertained by other investigators that when pure iron is brought into intimate contact with carbon and heated, the rate of carburization increases slowly under increases of temperature until a temperature of about 1250° C. is attained, when it increases very abruptly and becomes substantially instantaneous. In smelting iron ores in a reverberatory furnace with an oxidizing flame, I have found that below certain temperature limits the iron carburizes and melts so slowly that it is exposed to the action of the atmosphere of the furnace so long that it is partially or completely reoxidized, resulting in excessive loss of iron in the slag. At higher temperatures carburization is rapid and complete and the iron melts quickly, falling down into the molten bath where it is protected from oxidation.

In addition to this rapid carburization above a critical temperature, thereby shortening the time that must elapse before the reduced metal melts and falls down into the molten bath where it is protected from reoxidation, a further material protection against reoxidation may be secured by operating above this temperature. This is brought about by taking advantage of the fact that an increase in temperature from a point below the critical carburization temperature to a point above such temperature, say from 1500° to 1575° C., only slightly accelerates the combustion of the carbon exposed at the surface of the charge while such increase in temperature causes a much more rapid formation of the slag and carburization and melting of the reduced iron.

Therefore, by providing a suitable excess of carbon in the charge above that required to combine with the oxygen of the ore and maintaining the temperature above the critical carburization temperature, sufficient carbon can be maintained on the exposed surfaces of the charge so as effectively to prevent reoxidation of the reduced metal. Such sufficiency of carbon is maintained automatically due to the fact that such temperature will bring about the substantial equilibrium or positive differential in the reactions above stated. If the temperature of the furnace is reduced below this critical temperature the ore reduces and the iron carburizes and melts so slowly that the protective layer of carbon is burned away from above, leaving the metal exposed to the oxidizing action of the furnace gases.

I have found further that above such critical temperature, a substantial amount of the carbon present at and adjacent the smelting surface is present in graphitic form, while below such temperature there is present practically no graphitic carbon. It is known that amorphous carbon can be changed to graphitic carbon under proper conditions at high temperatures. It is also known that graphitic carbon is a relatively rapid carburizing agent. It, therefore, appears to be desirable for economical results to operate the furnace at such temperature and under such conditions that the carbon at and adjacent the surface will comprise a substantial proportion of graphitic carbon.

As an example of the influence of temperature, it has been found that when smelting in an open hearth furnace, a charge made up substantially of the following constituents and in the following proportions: 70 lbs. of magnetic oxide of iron, 14 lbs. of silica, 30 lbs. of Pocahontas coal, and 14 lbs. of limestone, the slag formed will contain 14% iron at 1525° C., 9% iron at 1550° C., and only 4% iron at 1575° C. It has also been found that for this mixture, about 1550° C. is the critical temperature. Above this temperature the losses of iron in the slag are small and below this temperature such losses are large. With this particular ore mixture, satisfactory economical operations are not secured below 1550° C. All of these temperatures were recorded by use of an optical pyrometer sighted on the surface of the molten bath and are intended merely to serve as an indication but not as a measurement of the actual temperature of the reaction itself.

The difficulty of accurately measuring temperatures of this magnitude in industrial practice makes it necessary to depend upon a means of temperature indication for control purposes which, while inaccurate with respect to the absolute value of any specific measurement, insures a sufficient degree of accuracy with respect to relative values. In other words, while it is not practical to determine with absolute accuracy the value of a specific temperature at a specific point within the furnace, it is, however, possible to obtain a value with a high degree of accuracy with respect to its relation to other temperature measurements, and thus it is possible to accurately control the operation with respect to temperature. This is to be borne in mind when comparing my observations as to the critical carburization temperature and those of the prior investigators which were conducted under conditions permitting of accurate temperature measurements. In other words, it is probable that the actual temperature at or adjacent the surface of the charge in the smelting and carburizing zone is in the neighborhood of 1250° C. when the optical pyrometer indicates a temperature of 1550° C. on the surface of the molten bath. In an operation in a furnace of the reverberatory type such as here contemplated the temperature at the surface of the ore banks and the temperature on the surface of the molten bath may be considered as practically the same. It will be understood that the reason for observing the temperature at the surface of the molten bath rather than on the surface of the ore banks is concerned merely with the convenience and greater degree of accuracy obtainable at this point with an optical pyrometer over the accuracy possible when attempting to sight on the less luminous surface of the ore bank.

It will be noted that in the example given hereinbefore, the temperature reading at the period of satisfactory operation was 1550° C. With different ores and with different carbon content of the charge, and/or different amount and character of slag-forming materials present, the operating temperature at which the furnace should be maintained will depend upon the changed conditions within the furnace and will vary with such changes.

According to an example of the operation of this process, the results of which were hereinbefore indicated, the ore, carbon and slag-forming materials, previously crushed or otherwise reduced to finely divided form (ore reduced to 150 mesh, slag-forming materials to 4 mesh and coal to 6 mesh), were mixed and fed substantially continuously through openings in the roof of an acid-lined reverberatory furnace. Sufficient of the mixture was introduced to build up and maintain a body of charge of relatively large surface, that was exposed to the heating action of the flame passing through the furnace. The reduction of the ore proceeded from the surface of the charge inwardly and as the reduced metal became carburized it melted and small drops or globules thereof and of the melted slag-forming materials collected on the sloping surface of the charge and ran down rapidly into the bath which collected at the bottom.

The slag-forming constituents of the charge may be so adjusted as to produce a basic, neutral or acid slag.

I have also found that the rate of carburization will vary considerably with the type of carbonaceous material introduced in the charge. Thus, with the more graphitic forms of carbon, the rate of carburization is higher than with the less graphitic forms of carbon. Therefore, the critical temperature will be lower if a more graphitic form of fuel is used than if a less graphitic form of fuel is used.

The term "ores" as used herein is to be understood as including not only the naturally occurring iron-bearing materials but also materials such as gas washer sludge, flue dust, pyrites cinder, mill scale, turnings, borings and other mill and machine shop waste.

It is also to be understood that the process is not limited to materials of any particular degree of fineness and structure; the only requirement being that the material should be sufficiently finely divided to allow of uniform mixing of the iron-bearing material with the coal and flux. With the finely divided material, it has been found advisable to add a sufficient amount of water to prevent dust losses.

While the invention has been described with particular reference to its application in the treatment of iron-bearing materials, it is to be understood that it is equally applicable in the reduction of other metals from their ores, such for example as chromium, nickel, manganese and copper.

What I claim is:

1. A process of treating iron-bearing material which comprises mixing such material with a suitable quantity of slag-forming constituents and with carbon sufficient for the hereinafter mentioned reactions, heating the said mixture with an oxidizing flame in a furnace of the reverberatory type to cause carbon to unite with the oxygen of the iron-bearing material and thus to effect reduction of the mettal content of said material, and maintaining the temperature in the smelting zone above the point at which the rate of carburization of the reduced metal content present in said zone changes abruptly and becomes high as compared with the rate of carburization below such temperature and at which there is a quick melting of the carburized iron and rapid slag formation, while causing further portions of the carbon to unite with the oxygen of the furnace atmosphere.

2. A process of treating iron-bearing material which comprises mixing said material with a suitable quantity of slag-forming constituent and with carbon sufficient for the hereinafter mentioned reactions, feeding said mixture to a furnace of the reverberatory type so as to establish a body of charge of relatively large surface therein, exposing the charge to the heating action of an oxidizing flame passing through the furnace to effect reduction and immediate carburization of the metal content of said material, and maintaining the temperature in the smelting zone above the point at which the rate of carburization of the reduced metal content present in said zone changes abruptly and becomes high as compared with the rate of carburation below such temperature and at which there is a rapid melting of the carburized iron and rapid slag formation, while causing further portions of the carbon to unite with the oxygen of the furnace atmosphere.

In testimony whereof, I have signed my name to this specification this 12th day of July, 1928.

EDWARD W. DAVIS.